(12) United States Patent
Krok et al.

(10) Patent No.: US 8,531,173 B2
(45) Date of Patent: Sep. 10, 2013

(54) SYSTEM AND METHOD FOR OPERATING A TAP CHANGER

(75) Inventors: Michael Joseph Krok, Clifton Park, NY (US); Sahika Genc, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 16 days.

(21) Appl. No.: 13/077,504

(22) Filed: Mar. 31, 2011

(65) Prior Publication Data

US 2012/0249278 A1  Oct. 4, 2012

(51) Int. Cl.
G05F 1/14 (2006.01)
G05F 1/70 (2006.01)

(52) U.S. Cl.
USPC .............................. 323/340; 700/291; 700/298

(58) Field of Classification Search
USPC ................. 323/255, 256, 340, 341, 205, 207, 323/209; 700/286, 291, 297, 298
See application file for complete search history.

(56) References Cited

U.S. PATENT DOCUMENTS

| | | | | |
|---|---|---|---|---|
| 5,541,498 A * | 7/1996 | Beckwith | | 323/211 |
| 6,924,565 B2 * | 8/2005 | Wilkins et al. | | 290/44 |
| 8,019,697 B2 * | 9/2011 | Ozog | | 705/412 |
| 8,195,338 B2 * | 6/2012 | Feng et al. | | 700/286 |
| 8,283,903 B2 * | 10/2012 | Feng | | 323/255 |
| 2010/0001700 A1 | 1/2010 | Santos | | |
| 2011/0084672 A1 * | 4/2011 | Labuschagne et al. | | 323/255 |
| 2011/0196546 A1 * | 8/2011 | Muller et al. | | 700/295 |
| 2012/0182157 A1 * | 7/2012 | Carr | | 340/870.02 |

FOREIGN PATENT DOCUMENTS

| | | |
|---|---|---|
| EP | 0495590 A2 | 7/1992 |
| JP | 5328608 A | 12/1993 |
| JP | 6059758 A | 3/1994 |
| JP | 2004173384 A2 | 6/2004 |
| WO | 2007107872 A3 | 12/2007 |

OTHER PUBLICATIONS

B. W. Kennedy et al., "Conservation Voltage Reduction (CVR) At Snohomish County PUD," Transactions on Power Systems, vol. 6, No. 3, Aug. 1991, pp. 986-998.
M. E. Elkhatib et al., "Optimal Control of Voltage Regulators for Multiple Feeders," IEEE Transactions on Power Delivery, vol. 25, No. 4, Oct. 2010, pp. 2670-2675.
Search Report and Written Opinion from corresponding EP Application No. 12161899.5-2210 dated Aug. 24, 2012.

* cited by examiner

Primary Examiner — Gary L Laxton
(74) Attorney, Agent, or Firm — Nitin Joshi

(57) ABSTRACT

A method of operating a tap changer of a transformer or a voltage regulator in a power grid includes obtaining a load forecast for a time period. An average voltage profile is determined for the time period based on the load forecast. The method further includes estimating tap positions of the tap changer for leveling the average voltage profile during the time period. Switching signal commands are provided to the tap changer based on the estimated tap positions.

18 Claims, 4 Drawing Sheets

SYSTEM AND METHOD FOR OPERATING A TAP CHANGER

BACKGROUND

Embodiments of the invention relates generally to an electric power grid and more specifically to control of tap changers for voltage regulators or transformers.

The basic structure of an electric power system comprises various hardware elements such as generators, transformers, and real-time monitoring equipment, and software such as power flow analysis software, fault detection software, and restoration software for generation, transmission, and distribution of electricity.

In general, power system operators ensure the quality of the power supplied to the customers by maintaining the load bus voltages within their permissible limits. Any changes to the system configuration or in power demands can result in higher or lower voltages in the system. This situation can be improved by reallocating the reactive power generated in the system by adjusting transformer taps, voltage regulator taps, changing generator voltages, and by switching VAR sources such as capacitor banks.

There are various algorithms available for optimizing operation of tap changer for transformers or voltage regulators. However, most of these algorithms are combined with reactive power control algorithms and thus lead to long convergence times. Further most of these algorithms result in certain transformer taps being switched on and off more times in a day than desired. Frequent switching of transformer taps degrades switching contacts of the transformer taps and increases maintenance requirements.

Therefore, there is a need for an improved optimization approach to operate tap changers.

BRIEF DESCRIPTION

In accordance with an embodiment of the present invention, a method for operating a tap changer of a transformer or a voltage regulator is provided. The method includes obtaining a load forecast for a time period and determining an average voltage profile for the time period based on the load forecast. The method also includes estimating tap positions of the tap changer for leveling the average voltage profile during the time period and providing switching signal commands to the tap changer based on the estimated tap positions.

In accordance with another embodiment of the present invention, a tap changer control system including a load forecasting module, a load flow module, a tap position identification module and a switching circuitry is provided. The load forecasting module determines a load forecast for a time period and the load flow module determines an average voltage profile for the time period of interest. The tap position identification module estimates tap positions for a tap changer of a transformer or a voltage regulator for leveling the average voltage profile and the switching circuitry adjusts taps of the tap changer based on the estimated tap positions.

In accordance with yet another embodiment of the present invention, computer-readable medium comprising non-transitory computer-readable instructions that, when executed by a processor, cause the processor to perform a method of operating a tap changer of a transformer or a voltage regulator in a power grid is provided. The method includes obtaining a load forecast for a time period and determining an average voltage profile for the time period based on the load forecast. The method also includes estimating tap positions of the tap changer for leveling the average voltage profile during the time period and providing switching signal commands to the tap changer based on the estimated tap positions.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters are not exclusive of other parameters of the disclosed embodiments.

Figure 1:
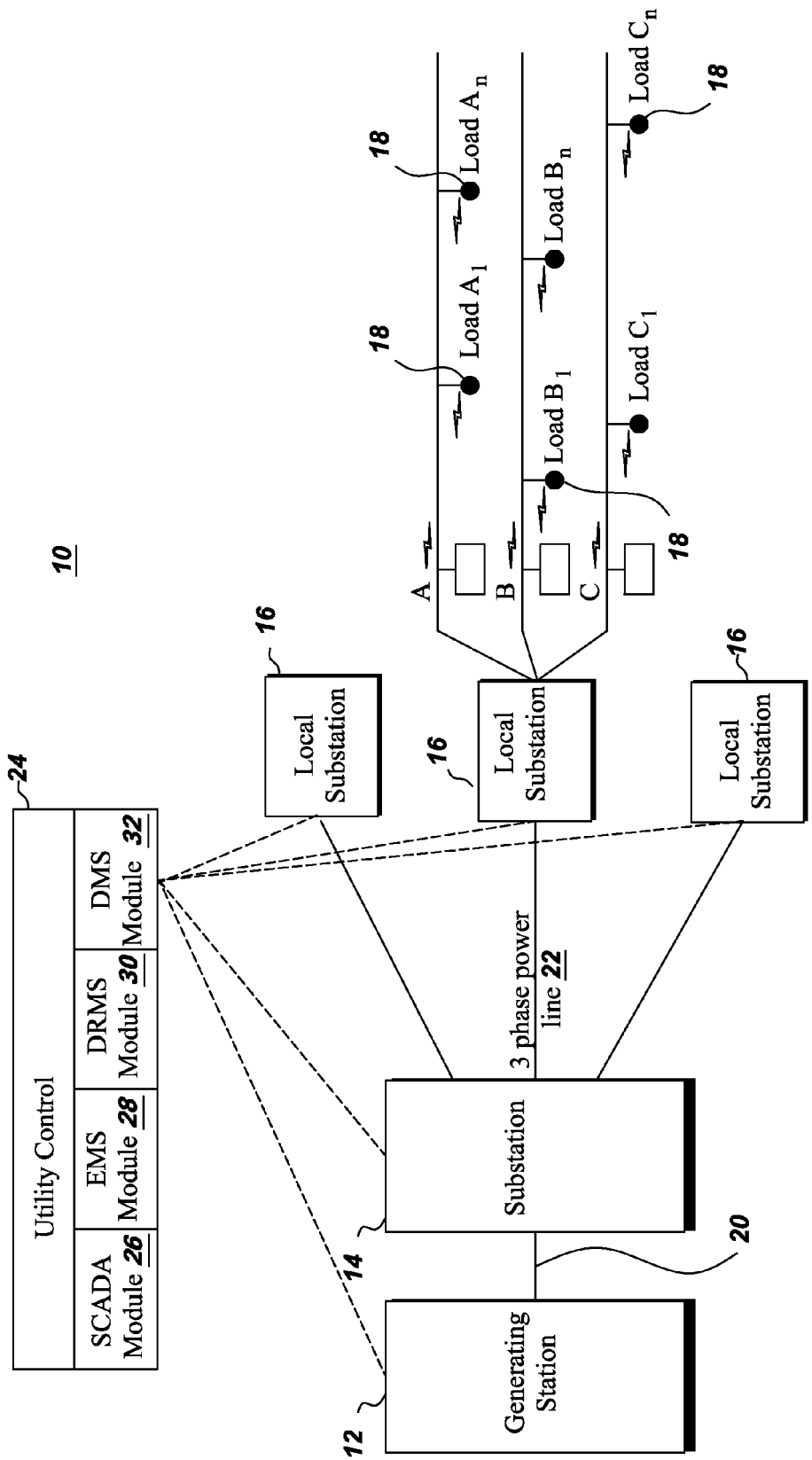
FIG. 1 is a diagrammatical representation of an overall electric system.

FIG. 1 illustrates a single line diagram of an overall electric system 10 from generation to utilization. The electric system 10 includes a generating station 12, a transmission substation 14, local substations or distribution substations 16 and loads 18. Generating station 12 may comprise a hydropower generating station, a thermal power generating station, a wind power generating station, or a solar power generating station, for example. Generating station 12 generates electricity at a generating station voltage which is typically in the range of 4 kV to 13 kV. The generating station voltage is stepped up to a higher transmission level voltage such as 110 kV and above by a generating station transformer (not shown) for more efficient transfer of the electricity.

The electricity at the transmission level voltage is transmitted to transmission substation 14 by primary transmission lines 20 that are configured to carry electricity long distances. At transmission substation 14, a reduction in voltage occurs for distribution to other points in the system through secondary transmission lines 22. Further voltage reductions for commercial and industrial or residential loads 18 may occur at distribution substation 16. The distribution substation 16 may supply electricity at voltages in the range of 4 kV to 34.5 kV, for example. The voltages may further be reduced by one or two more levels at distribution substation 16 or other local substations (not shown) receiving power from distribution substation 16 to supply the electricity to residential loads at lower voltages such as 120 V or 240 V. For stepping down the voltage at transmission substation 14 or distribution substation 16, fixed step down transformers may be used. Typically, the step down transformer is combined with a voltage regulator which can independently modify the output voltage of one or more phases of the transformer over the voltage ratio (=Vout/Vin) range of 0.9 to 1.1. Further voltage regulators (not shown) may be placed within the distribution system or at the distribution substation 16, for regulating voltage and reactive power further down the network from the voltage regulator. When a voltage regulator is located at the distribution substation, it is call called an On-Load Tap Changers (OLTCs). It should be noted that henceforth the term tap changer is used to describe both voltage regulators as well as OLTCs. Further, the voltage regulators and OLTCs may be used interchangeably.

A utility control center 24 is used in the system 10 for operation and maintenance of generating station 12, transmission substation 14, and distribution substations 16. Utility control center 24 receives data from these components and also provides control signals to these components. Loads 18 may communicate with their respective distribution substations 16 and thus, the utility control center 24 may also receive and transmit information to and from the loads 18. Components of the utility control center 24 include a supervisory control and data acquisition (SCADA) system 26, an energy management system (EMS) 28, a demand response management system (DRMS) 30, and a distribution management system (DMS) 32. In one embodiment, some of these components may be provided separately in system 10 rather than being integrated in the utility control center 24. In a particular embodiment, all the components may not be necessary and one or more component may be omitted.

As will be appreciated by those skilled in the art, SCADA usually refers to basic control and monitoring of field devices including breakers, switches, capacitors, reclosers, and transformers. EMS 28 coordinates and optimizes power generation and transmission, whereas DMS 32 coordinates power distribution. EMS 28 and DMS 32 include applications such as automatic generation control (AGC), load forecasting, OLTC and voltage regulator switching controls, engineering load flow modeling, economic dispatch, energy accounting, interchange transactions, and VAR/voltage control. DRMS 30 controls peak demand and produces other economies without major inconvenience to the customer.

Figure 2:
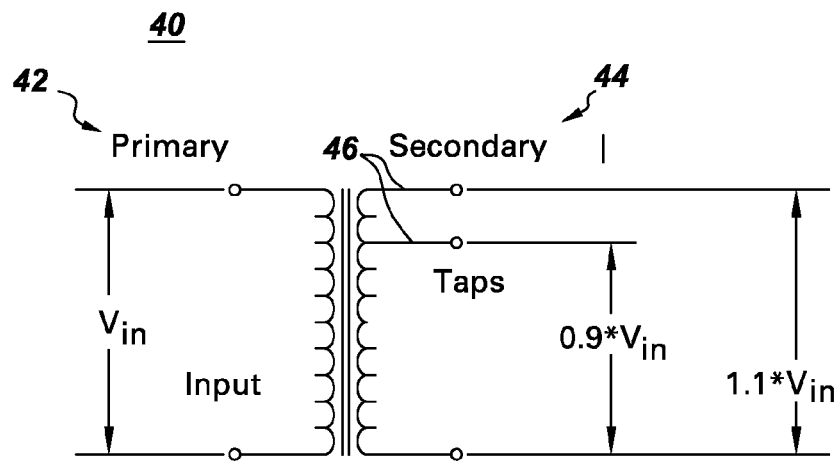
FIG. 2 is a schematic representation of a conventional tap changer.

FIG. 2 shows a schematic diagram of a conventional voltage regulator 110. Voltage regulator 110 includes a primary winding 42, a secondary winding 44, and transformer taps 46. As will be appreciated by those skilled in the art, when a transformer has an equal number of winding turns on the primary winding and secondary winding, the input and output voltage will be equal. By adding or subtracting the number of turns on the primary winding or secondary winding, the output voltage can be changed. For example, if primary winding 42 has 120 turns and secondary winding 44 has 60 turns then the output to input voltage ratio will be one-half i.e., the output voltage on the secondary winding will be half of the input voltage on the primary winding. Rather than physically changing the number of turns, the turns ratio or voltage ratio can be altered by changing the location of the physical connection to the secondary winding using transformer taps 46. In FIG. 2, secondary winding 44 includes voltage taps 46. Thus, in the illustrated embodiment, the output voltage at secondary winding 44 depends on taps between which the load is connected and can vary between 0.9 Vin to 1.1 Vin where Vin is the input voltage on the primary winding 42. There may be multiple taps (not shown) in between 0.9 Vin and 1.1 Vin for obtaining voltages in between. Generally a tap changer has 32 taps, out of which 16 are for increasing the voltage (1 to 16 taps) whereas 16 are for decreasing the voltage (−1 to −16 taps). For example, if the output voltage is Vin with no taps employed or switched on, then tap 10 when switched on may yield output voltage of 1.0625 Vin and tap −10 will yield output voltage of 0.9375 Vin. It should be noted that the actual tap setting and tap will vary depending on the application. For example, for a distribution transformer the output voltage need not go as low as 0.9 Vin but in certain conditions it may be necessary that the output voltage be higher than the input voltage. In another embodiment, the output voltage may need to be lower than 0.9 Vin.

Figure 3:
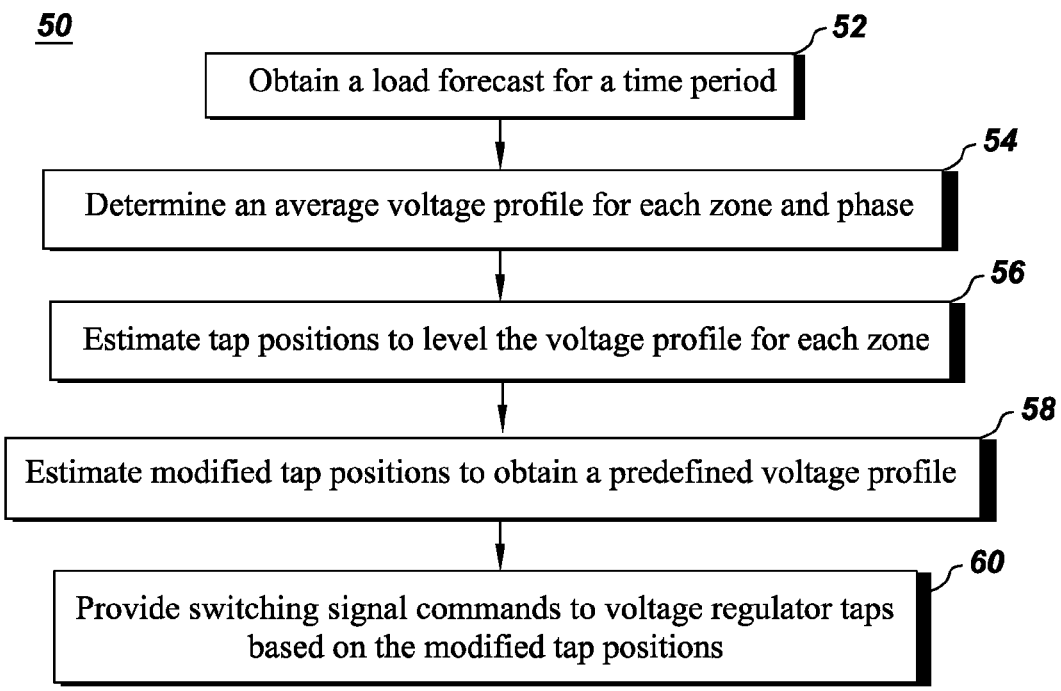
FIG. 3 is a flow chart representing a method of operating tap changers in accordance with an embodiment of the present invention.

FIG. 3 shows a method 50 of operating a tap changer in accordance with an embodiment of the present invention. The method may be employed by the DMS 32 or EMS 28 (FIG. 1), for example. The method includes obtaining a load forecast for a time period or period of interest in step 52. The load forecast may be determined in terms of MVA loading which is indicative of active as well as reactive power for a particular zone. In one embodiment, the period of interest may be an hour, several hours, a day, or any other suitable time determined by the user or the operator. In another embodiment, the load forecast is determined for k time steps into the future, where k is again a number determined by the operator.

Load forecasting is useful in determining how much load each phase can have at any given time of the period of interest. This information may be used for running a load flow on the distribution system to estimate the state in terms of voltages at different points. Load forecasting techniques utilize various factors such as time, weather conditions, customer types, distribution system conditions, and historical load and weather data to provide a load forecast. As will be appreciated by those skilled in the art, load forecasting methods may include similar day approach, various regression models, time series, neural networks, expert systems, fuzzy logic, and statistical learning algorithms.

Once the load forecast is obtained for each time step, an average voltage profile may be determined for each zone and phase in step 54. In one embodiment, a zone refers to an electrical network or a distribution system between two tap changers. For example, if a voltage is stepped down from 69 kV to 34.5 kV through a fixed step down transformer and it is further reduced to 12.47 kV through a second step down transformer at another distribution substation, then the electric system between the 34.5 kV to the second 12.47 kV will be considered as one zone. The voltages then may be determined for each node in the distribution system using the 12.47 kV as a base voltage for each phase of this zone. As will be appreciated by those skilled in the art, the base voltage value is utilized for normalizing quantities to a common base for calculation purposes. Tap changers or voltage regulators may be located at the output of the first step down transformer at the interconnection between the transmission system and the distribution system and at the second 12.47 kV substation to allow further adjustment of distribution voltage in the voltage ratio range of 0.9 to 1.1 per unit (pu). To determine the node voltages, a load flow algorithm may be utilized. The load flow algorithm obtains complete voltage angle and magnitude information for each bus or each node on the distribution system for forecasted active and reactive loads. Since determining voltage information based on active and reactive load information is a nonlinear problem, numerical methods are employed to obtain a solution that is within an acceptable tolerance. Numerical methods for the load flow algorithm may include William Kersting's backward/forward sweep algorithm, for example. The average voltage profile then may be determined by calculating the average of all node voltages in the distribution system for each phase and time period. In one embodiment, the voltage profile is calculated with half of the taps of the tap changer being in the ON position. In other words, if there are 32 taps to the tap changer, each designed to increase the voltage (compared to 0 tap), then the voltage profile is determined with 16 taps of tap the changer being in the ON position. However, in other embodiments, the voltage profile may be determined with different tap positions.

Once the voltage profile is determined in step 54, the tap positions of the tap changer for the period of interest are estimated in step 56 to level the voltage profile. It should be noted that in one embodiment, leveling the voltage profile means obtaining a constant voltage throughout the period of interest. The voltage may not be absolutely constant and may include certain variations but the idea is that the overall voltage profile should not have significant variations. To level the voltage profile, a certain amount of voltage called a flat voltage value or desired value may be fixed for the period of interest. In one embodiment, the flat voltage value may be determined such that the number of tap position changes is minimized. In another embodiment, the flat voltage value may be an average value of the minimum and maximum voltages of the voltage profile or in yet another embodiment, it could be a median value. For estimating tap positions i.e., to identify approximate number of taps need to be switched ON or OFF, the difference between the average voltage profile and the flat voltage value may be divided by the voltage per tap. If the flat voltage value is higher compared to the average voltage profile value, then one or more additional taps may be switched on. Otherwise, if the flat voltage value is lower compared to the average voltage profile value, one or more taps may be switched off depending upon the desired primary to secondary voltage ratio. For example, if the flat voltage value desired is 0.98 pu and if the forecasted average voltage at a particular time period is 0.9675 pu then to achieve 0.98 pu, two of the taps may be switched ON assuming 0.00625 pu volts/tap. Similarly, if the voltage is 0.88 pu then 16 taps may be switched ON.

Figure 4:
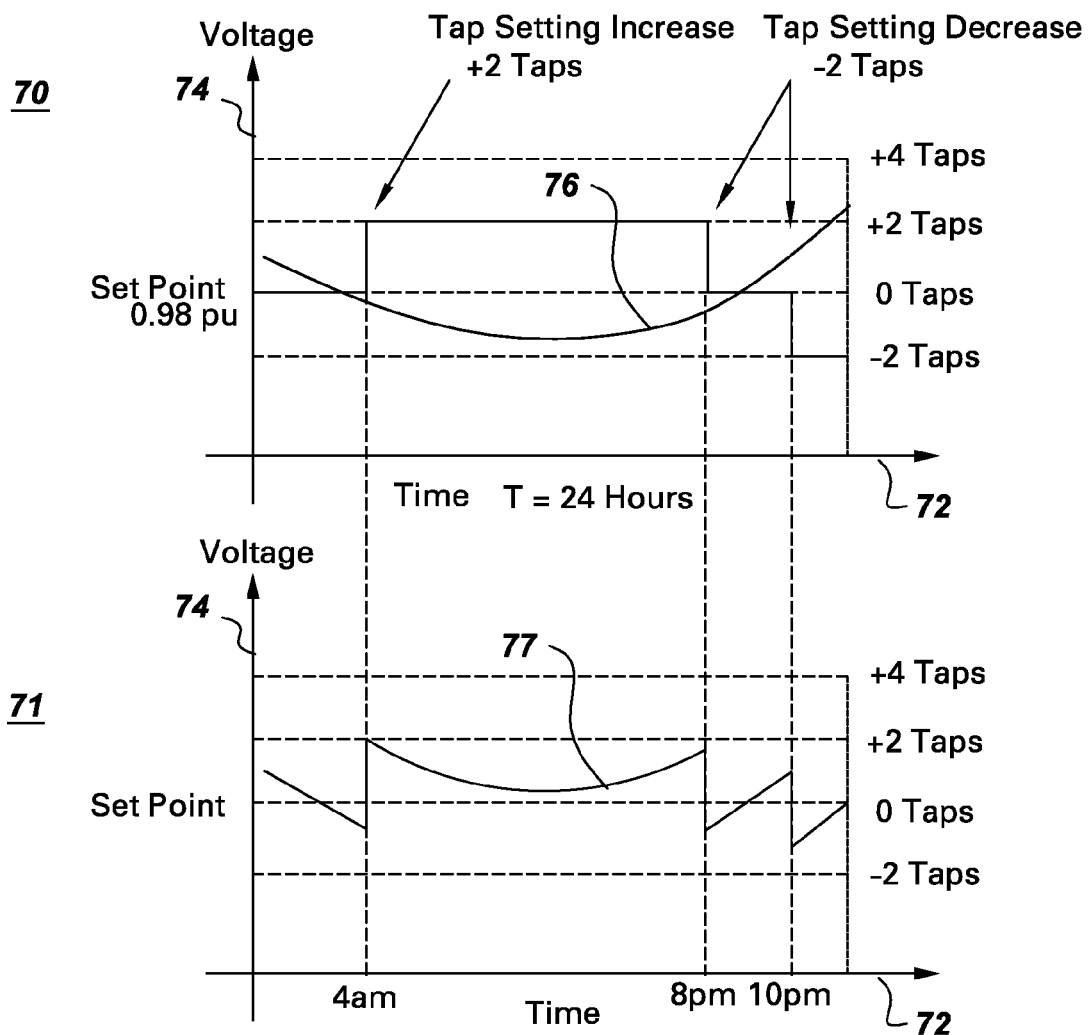
FIG. 4 is a graphical representation of forecasted and resulting average voltage profiles.

FIG. 4 shows example plots 70 and 71 of voltage profiles determined in accordance with an embodiment of the present invention. Horizontal axis 72 in both plots 70, 71 represents time in hours whereas vertical axis 74 represents average voltage across all the nodes in a zone in per unit (pu). It can be seen from plot 70 that a predicted average voltage profile 76 varies from a minimum value of about two tap settings below the desired flat voltage value (for example, 0.98 pu) to a maximum value of about two tap settings above the desired flat voltage value over the period of 24 hours. Further, plot 71 shows the resulting average voltage profile 77 based on the tap changer operation in accordance with an embodiment of the present invention. The resulting average voltage profile 77 is calculated with three adjustments in tap settings. The first tap change occurs at time 4 am with a 2 tap setting increase, the second and third tap changes with a 2 tap setting decrease at each adjustment occurs at 8 pm and 10 pm, respectively.

Referring back to FIG. 3, once the flat voltage value is achieved or realized in step 56, the voltage may further may be increased or decreased to a defined voltage by a single tap change throughout the period of interest in step 58. For example, if the flat voltage value is 1.00125 pu and the defined voltage value is 0.98 pu then throughout the period of interest (e.g. 24 hours), the current tap setting is to be reduced by 3 taps (0.00625 pu volts/tap). In one embodiment, the power flow algorithm with new identified tap settings may be utilized again before obtaining the defined voltage value to verify if any significant changes have occurred to the average voltage profile. In another embodiment, the defined voltage may be determined by the utility company and is based on a conservation voltage reduction (CVR) factor. As will be appreciated by those skilled in the art, the CVR factor is the percentage reduction in load consumption resulting from a one percent reduction in the voltage. In certain embodiments, CVR factor may range from 0.4 to 1.0. Once a schedule for switching the taps of tap regulators is determined for the period of interest, the information may be utilized in step 60 for operating the tap changer by providing appropriate switching signal commands to the taps of tap changer by EMS 28 or DMS 32 of FIG. 1.

Figure 5:
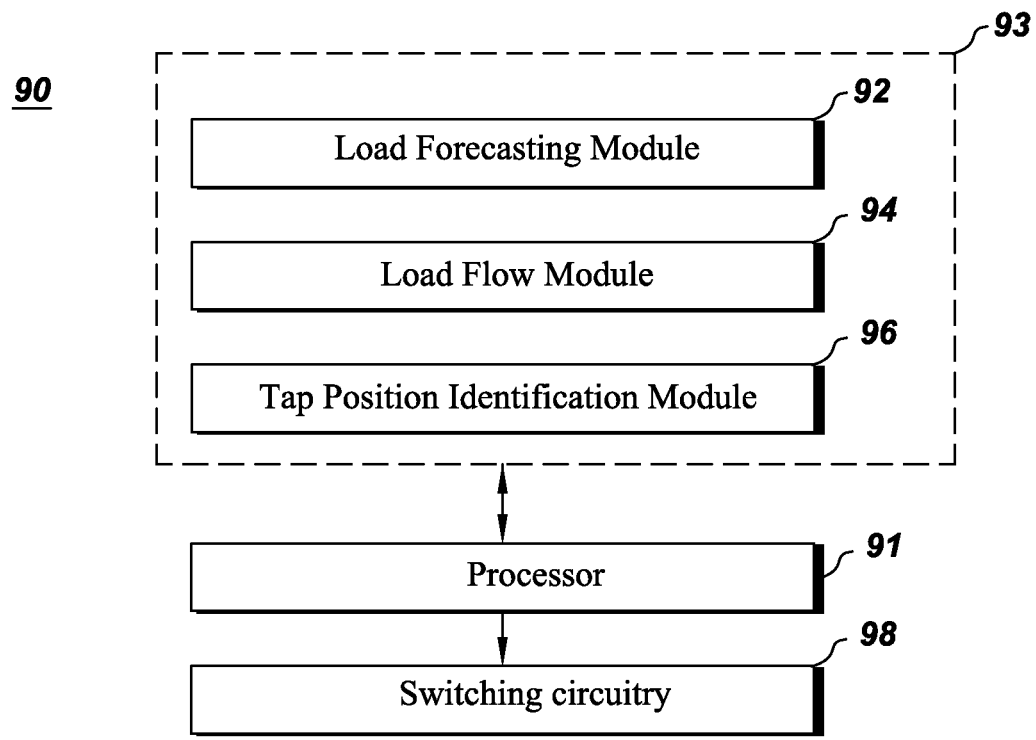
FIG. 5 is a diagrammatical representation of a tap changer control system in accordance with an embodiment of the present invention.

FIG. 5 shows a tap changer control system 90 in accordance with an embodiment of the present invention. System 90 includes a processor 91 coupled to a memory 93 comprising a load forecasting module 92 for obtaining load forecasts for a time period which may be an hour or 24 hours or any other time as determined by the operator. It should be noted that as used herein, the term module may refer to or include a computer program or code that provides the described functionality. A load flow module 94 runs a power flow on the load forecast data obtained from the load forecasting module 92 and determines an average voltage profile i.e., average voltage across all the nodes for each of the phases in a given zone for the time period. The zone may be an electric network between two tap changers. A tap position identification module 96 determines a flat voltage value to level the voltage profile and also estimates tap positions throughout the time period to achieve a flat voltage profile. In one embodiment, the module 96 may further identify tap positions for the period of interest to modify the flat voltage profiles to a predetermined voltage value profile wherein the predetermined voltage value may be determined based on the CVR factor. Processor 91 processes the data obtained from memory 93 and provides switching signal commands to a switching circuitry 98. In one embodiment, switching signal commands may be digital signals with 1 or 0 value. When the switching signal command is 1, it may mean the respective tap should be switched ON. Similarly, when the switching signal command is 0, it may be an indication to switch off the respective tap. When the switching signal command is ON, the respective tap will be switched ON whereas the tap will be switched OFF if the switching signal command is OFF. Switching circuitry 98 then provides switching signals to taps of a tap changer based on the modified tap positions determined for the period of interest by the tap position identification module 96.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of operating a tap changer of a transformer or a voltage regulator in a power grid comprising:
   obtaining a load forecast for a time period;
   determining an average voltage profile for the time period based on the load forecast;
   estimating tap positions of the tap changer for leveling the average voltage profile during the time period; and
   providing switching signal commands to the tap changer based on the estimated tap positions;
   wherein determining the average voltage profile comprises determining an average of node voltages for a phase in a zone.

2. The method of claim 1, wherein the load forecast comprises active and reactive power forecasts.

3. The method of claim 1, wherein the time period comprises a time determined by an operator including an hour, a day or a week.

4. The method of claim 1, wherein the zone comprises a network between two tap changers.

5. The method of claim 1, wherein determining the average voltage profile comprises running a load flow algorithm on the load forecast.

6. The method of claim 1, wherein leveling the average voltage profile comprises determining a flat voltage value for the time period.

7. The method of claim 6, wherein tap positions are based on the average voltage profile, the flat voltage value and a voltage value per tap.

8. The method of claim 6, wherein the flat voltage value comprises a predetermined voltage value.

9. The method of claim 8, wherein the predetermined voltage value may be determined based on conservation voltage reduction factor.

10. The method of claim 6, wherein the flat voltage value is determined to minimize tap position changes.

11. The method of claim 6, wherein the flat voltage value comprises an average value or a median value of a minimum and a maximum voltages of the voltage profile.

12. A tap changer control system comprising:
- a load forecasting module to determine a load forecast for a time period;
- a load flow module to determine an average voltage profile for the time period of interest;
- a tap position identification module to estimate tap positions of a tap changer of a transformer or a voltage regulator for leveling the average voltage profile; and
- a switching circuitry to adjust taps of the tap changer based on the estimated tap positions;
- wherein the average voltage profile comprises an average of node voltages for a phase in a zone.

13. The system of claim 12, wherein the load forecast comprises active and reactive power forecasts.

14. The system of claim 12, wherein the zone comprises a network between two tap changers.

15. The system of claim 12, wherein the load flow module comprises a numerical method to obtain average voltages over the time period.

16. The system of claim 12, wherein leveling the average voltage profile comprises determining a flat voltage value for the time period.

17. The method of claim 16, wherein tap positions are based on the average voltage profile, the flat voltage value and a voltage value per tap.

18. A computer-readable medium comprising non-transitory computer-readable instructions that, when executed by a processor, cause the processor to perform a method of operating a tap changer of a transformer or a voltage regulator in a power grid, the method comprising:
- obtaining a load forecast for a time period;
- determining an average voltage profile for the time period based on the load forecast;
- estimating tap positions of the tap changer for leveling the average voltage profile during the time period; and
- providing switching signal commands to tap changer based on the estimated tap positions;
- wherein determining the average voltage profile comprises determining an average of node voltages for a phase in a zone.

* * * * *

UNITED STATES PATENT AND TRADEMARK OFFICE
CERTIFICATE OF CORRECTION

| | | |
|---|---|---|
| PATENT NO. | : 8,531,173 B2 | Page 1 of 1 |
| APPLICATION NO. | : 13/077504 | |
| DATED | : September 10, 2013 | |
| INVENTOR(S) | : Krok et al. | |

It is certified that error appears in the above-identified patent and that said Letters Patent is hereby corrected as shown below:

In the Claims

In Column 8, Line 11, in Claim 17, delete "method" and insert -- system --, therefor.

Signed and Sealed this
Twenty-fifth Day of February, 2014

Michelle K. Lee
*Deputy Director of the United States Patent and Trademark Office*